(12) United States Patent
Wong (10) Patent No.: US 6,441,878 B1
(45) Date of Patent: Aug. 27, 2002

(54) LIQUID CRYSTAL DISPLAY INCLUDING PIXEL ELECTRODES WITH SLIT-POSITIONED ALONG FIRST DIRECTION AND LONGITUDINAL AXIS OF LIQUID CRYSTAL MOLECULES POSITIONED ALONG SECOND DIRECTION

(75) Inventor: Jia-Fam Wong, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 09/682,053

(22) Filed: Jul. 16, 2001

(30) Foreign Application Priority Data

Sep. 29, 2000 (TW) .......................................... 089120439

(51) Int. Cl.[7] ........................ G02F 1/1343; G02F 1/133; C09K 19/02; G09G 3/36
(52) U.S. Cl. ........................ 349/143; 349/178; 349/34; 345/87
(58) Field of Search ............................ 349/34, 37, 143, 349/144, 177, 178; 345/87

(56) References Cited

U.S. PATENT DOCUMENTS

| | | | | |
|---|---|---|---|---|
| 6,057,905 A | * | 5/2000 | Nakajima | 349/110 |
| 6,141,077 A | * | 10/2000 | Hirata et al. | 349/143 |
| 6,285,431 B2 | * | 9/2001 | Lyu et al. | 349/129 |
| 6,300,996 B1 | * | 10/2001 | Matsuyama et al. | 349/143 |

* cited by examiner

Primary Examiner—William L. Sikes
Assistant Examiner—Tarifur R. Chowdhury
(74) Attorney, Agent, or Firm—Winston Hsu (57) ABSTRACT

A liquid crystal display is disclosed. The display includes a first substrate having a first surface, and a second substrate having a second surface being in parallel and opposite to the first surface. A pixel area is defined on the second surface. The display further includes a first electrode positioned on the first substrate, a pixel electrode positioned on the pixel area of the second substrate, a first slit positioned on the pixel electrode along a first direction, and a plurality of negative liquid crystal molecules positioned between the first electrode and the pixel electrode. The longitudinal axis of the liquid crystal molecules are positioned along a second direction horizontally. A first angle is formed between the second direction and the first direction. When a voltage is applied between the first electrode and the pixel electrode, a biased electrical field is formed such that (a) a first horizontal biased electric field is formed near the first slit, and perpendicular to the first direction to rotate the liquid crystal molecules and make the longitudinal axis of the liquid crystal molecules near the first slit rotate in parallel to the first direction, (b) the longitudinal axis of the liquid crystal molecules near the first electrode maintain in the second direction because no horizontal biased electrical field is formed near the first electrode, and (c) the liquid crystal molecules between the first electrode and the first slit gradually rotate from the second direction to the first direction.

28 Claims, 9 Drawing Sheets

LIQUID CRYSTAL DISPLAY INCLUDING PIXEL ELECTRODES WITH SLIT-POSITIONED ALONG FIRST DIRECTION AND LONGITUDINAL AXIS OF LIQUID CRYSTAL MOLECULES POSITIONED ALONG SECOND DIRECTION

BACKGROUND OF INVENTION

1. Field of the Invention

The present invention relates to a liquid crystal display (LCD), and more particularly to a liquid crystal display with a wide view angle.

2. Description of the Prior Art

The advantages of the liquid crystal display (LCD) include lighter weight, less electrical consumption, and less radiation contamination. Thus, the LCD have been widely applied to several portable information products, such as notebooks, PDAs, etc. The LCD gradually replaces the CRT monitors of the conventional desktop computers. The incident light will produce different polarization or refraction when the alignments of these liquid crystal molecules are different. The LCD utilizes the characteristics of the liquid crystal molecules to control the light transmittance and produce gorgeous images. However, the view angle of the conventional LCD is limited by the structure of the liquid crystal molecule and the optical character. Thus, it is necessary to develop a LCD with wider view angle.

Figure 1:
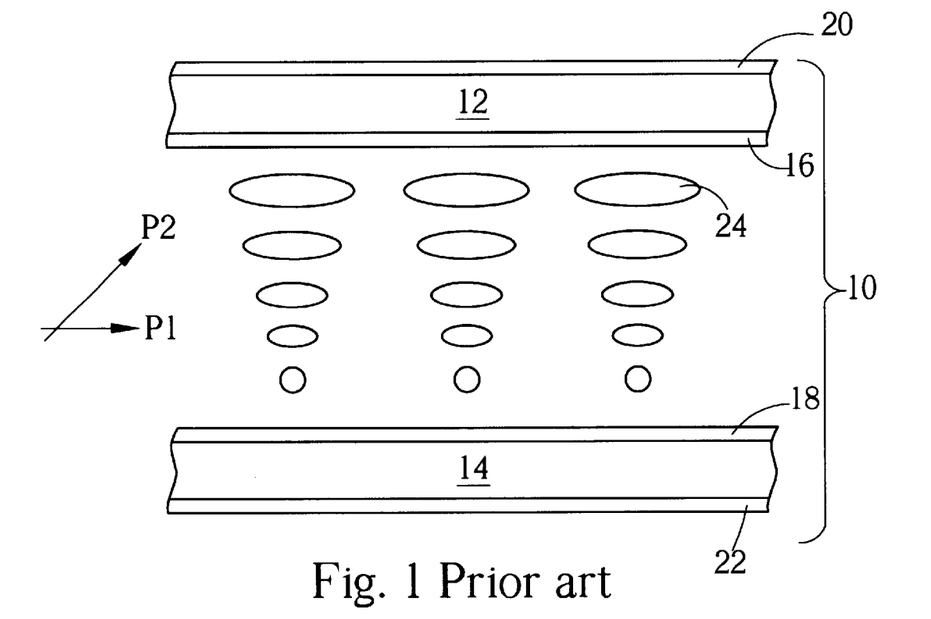
FIG. 1 is a schematic diagram of a TN-LCD in the bright state according to the prior art.
Figure 2:
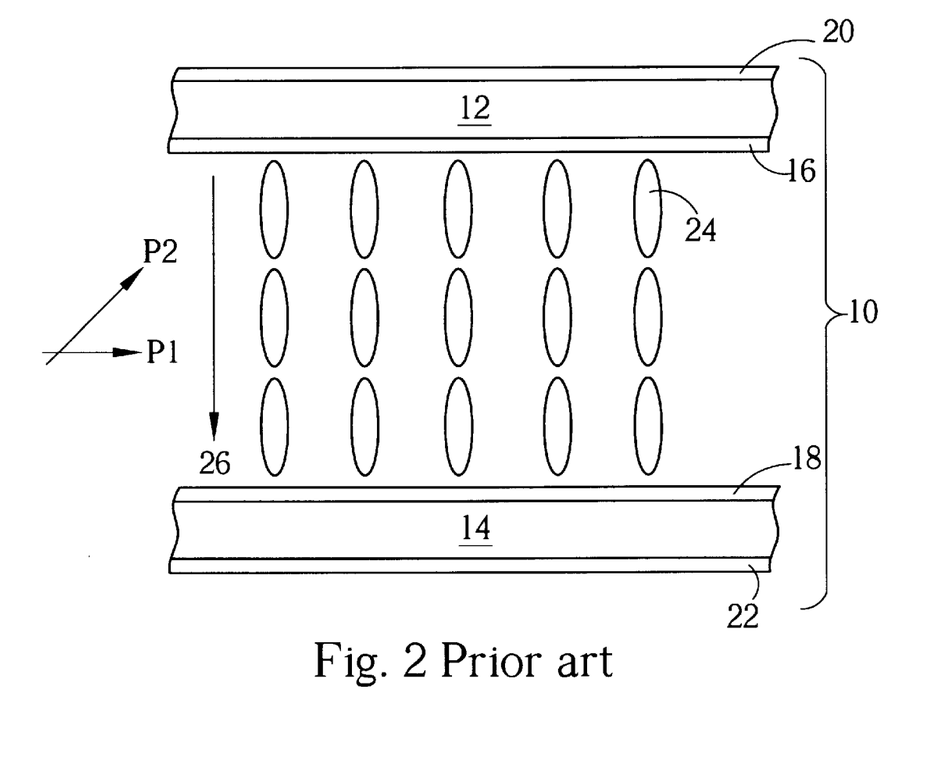
FIG. 2 is a schematic diagram of a TN-LCD in the dark state according to the prior art.

Please refer to FIG. 1 and FIG. 2. FIG. 1 is the schematic diagram of the twisted nematic (TN) liquid crystal display 10 in the bright state according to the prior art. FIG. 2 is the schematic diagram of the twisted nematic LCD 10 in the dark state according to the prior art. As shown in FIG. 1, the TN-LCD 10 includes an upper substrate 12, a bottom substrate 14 in parallel and opposite to the upper substrate 12, an upper electrode 16 positioned on the upper substrate 12, a lower electrode 18 positioned on the lower substrate 14, two polarizers 20, 22 respectively positioned above the upper substrate 12 and the lower substrate 14, and a plurality of anisotropic liquid crystal molecules 24 with the positive dielectric constant filled in the space between the upper substrate 12 and the lower substrate 14. The polarized direction P1 of the polarizer 20 is parallel to the paper surface, and the polarized direction P2 of the polarizer 24 is perpendicular to the paper surface. The arrangements of the liquid crystal molecules 24 from the top to the bottom are changed from the direction parallel to the paper surface to the direction perpendicular to the paper surface.

As shown in FIG. 1, when no voltage is applied between the upper electrode 16 and the lower electrode 18 of the LCD 10, the liquid crystal molecules 24 are not affected by any electric field, and are parallel to the polarizers 20, 22, respectively. A light (not shown) is entered from the bottom and polarized after passing through the polarizer 22. The direction of the polarized light is perpendicular to the paper surface, and the polarized light can pass through the lower substrate 14. Next, the polarized light follows the direction of the liquid crystal molecules 24 and the direction of the light is gradually changed from a direction perpendicular to the paper surface to a direction parallel to the paper surface. Finally, the polarized light can pass through the upper substrate and the bright state of the TN-LCD 10 is formed because the direction of the polarized light is parallel to the polarized direction of the polarizer 20.

As shown in FIG. 2, an electric field 26 is produced between the upper substrate 12 and the lower substrate 14 when a voltage is applied between the upper electrode 16 and the lower electrode 18. The liquid crystal molecule 24 has a positive dielectric constants so the longitudinal axis of the liquid crystal molecules 24 align in parallel to the direction of the electric field 26, and also align perpendicular to the upper and lower substrates 12, 14. Thus, the direction of the light passed through these liquid crystal molecules is perpendicular to the polarizer 20 and no light can pass through the polarizer 20 so that the observer located above the upper substrate 12 is unable to see light. Therefore, the dark state of the TN-LCD 10 is formed.

Usually, there is a pre-tilt angle (not shown) formed between the liquid crystal molecules 24 and the upper substrate 12 or the lower substrate 14 for lowering the threshold voltage of the TN-LCD 10 and easily rotating the liquid crystal molecules 24 influenced by the electric field 26. However, the pre-tilt angle results in asymmetry of the liquid crystal molecules 24 and different light intensities under different view angle. Thus, the TN-LCD 10 has a limited view angle of display. In the TN-LCD 10, only a part of the liquid crystal molecules 24 located in the center space between the two substrates 12, 14 can rotate perpendicular to the substrates 12, 14. The other parts of the liquid crystal molecules will be at an angle to the substrates 12, 14 due to the adhesion force between the liquid crystal molecules 24 and the substrates 12, 14. Moreover, when the above mentioned pre-tilt angle effect Is considered, the liquid crystal molecules 24 under dark state do not arrange so uniform according to FIG. 2. The performance of the dark state is poor and the contrast of the LCD 10 is decreased. Furthermore, the view angle of the TN-LCD 10 is small, even the left view angle is different from the right view angle.

SUMMARY OF INVENTION

It is an objective of the present invention to provide a liquid crystal display having wide view angle.

The present invention provides a liquid crystal display. The display includes a first substrate having a first surface, and a second substrate having a second surface being in parallel and opposite to the first surface. A pixel area is defined on the second surface. The display further includes a first electrode positioned on the first substrate, a pixel electrode positioned on the pixel area of the second substrate, a first slit positioned on the pixel electrode along a first direction, and a plurality of negative liquid crystal molecules positioned between the first electrode and the pixel electrode. The longitudinal axis of the liquid crystal molecules are positioned along a second direction horizontally. A first angle is formed between the second direction and the first direction. When a voltage is applied between the first electrode and the pixel electrode, a biased electrical field is formed such that (a). a first horizontal biased electric field is formed near the first slit, and is perpendicular to the first direction to rotate the liquid crystal molecules and make the longitudinal axis of the liquid crystal molecules near the first slit rotate in parallel to the first direction, (b). the longitudinal axis of the liquid crystal molecules near the first electrode maintain in the second direction because no horizontal biased electrical field is formed near the first electrode; (c). the liquid crystal molecules between the first electrode and the first slit gradually rotate from the second direction to the first direction.

It is an advantage of the present invention that the liquid crystal molecules In the LCD have a smaller pre-tilt angle, so that the light flux passing through the liquid crystal molecules will not be affected when viewing from different positions. Therefore, the LCD of the present invention has larger view angle, and resolves the problem about the asymmetry of the left and right view angles in the prior art.

DETAILED DESCRIPTION

Figure 3:
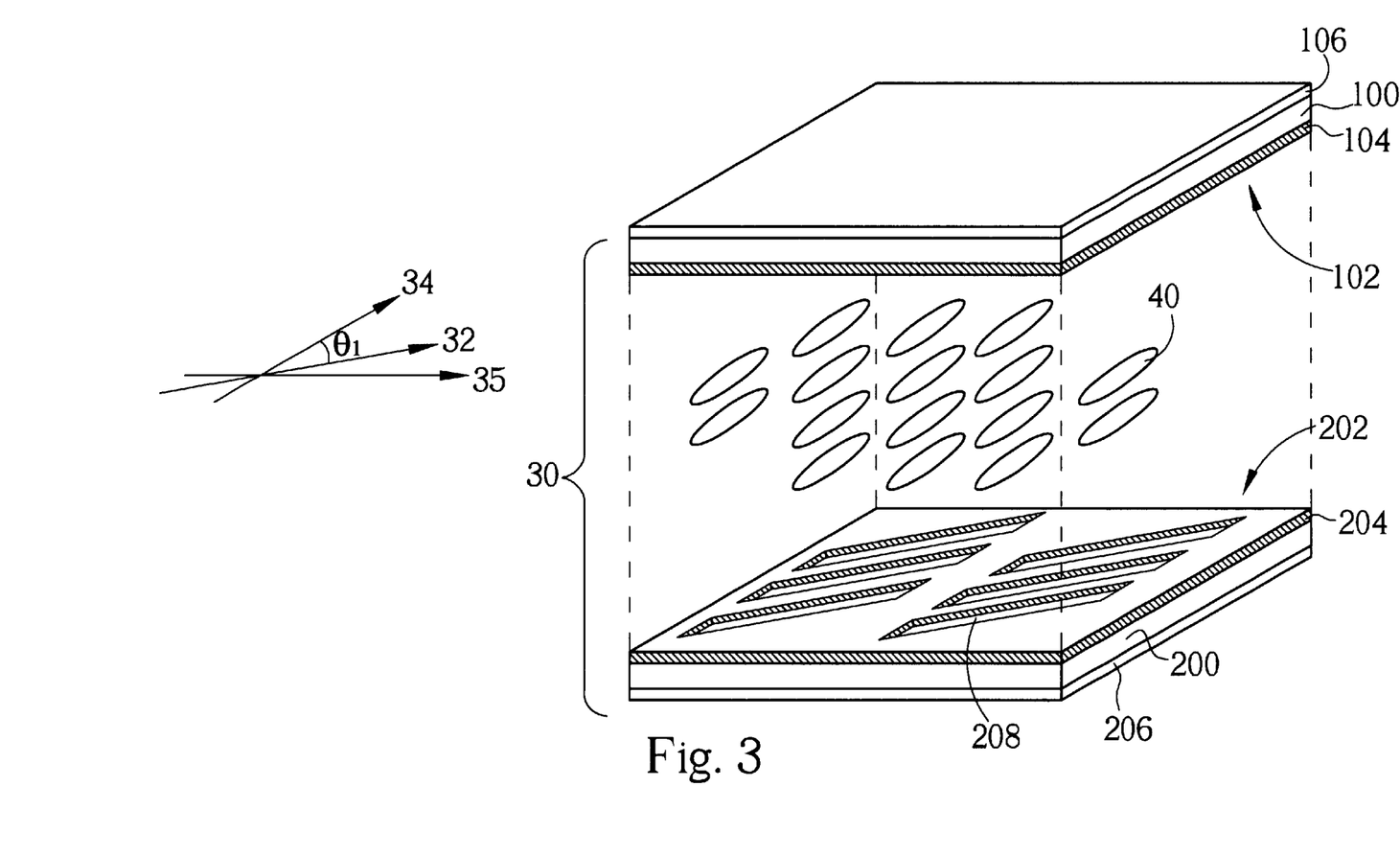
FIG. 3 is a schematic diagram of a LCD with a high contrast according to the present invention.

Please refer to FIG. 3 which is a schematic diagram of the LCD 30 according to the present invention. As shown in FIG. 3, the LCD 30 includes a first substrate 100 and a second substrate 200. The first substrate 100 includes a first surface 102, the second substrate 200 includes a second surface 202, and the second surface 202 is in parallel and opposite to the first surface 102. A pixel area(not shown) is defined on the second surface 202. The first substrate 100 can be defined as an upper or lower substrate, and the second substrate 200 can be a lower or upper substrate. In the present invention, the first substrate 100 is defined as the upper substrate and the second substrate 200 is defined as the lower substrate, but the structure shown in the present invention is still applicable to the substrates defined in reverse. A first electrode 104 is formed on the first surface 102 of the first substrate 100 and a first polarizer 106 is installed on the opposite surface. A pixel electrode 204 is formed on the second surface 202 of the second substrate 200 and a second polarizer 206 is installed on the opposite surface. The pixel electrode 204 is formed in the pixel area of the second substrate. The first electrode 104 and the pixel electrode 204 are formed by a transparent conductive material.

Figure 4:
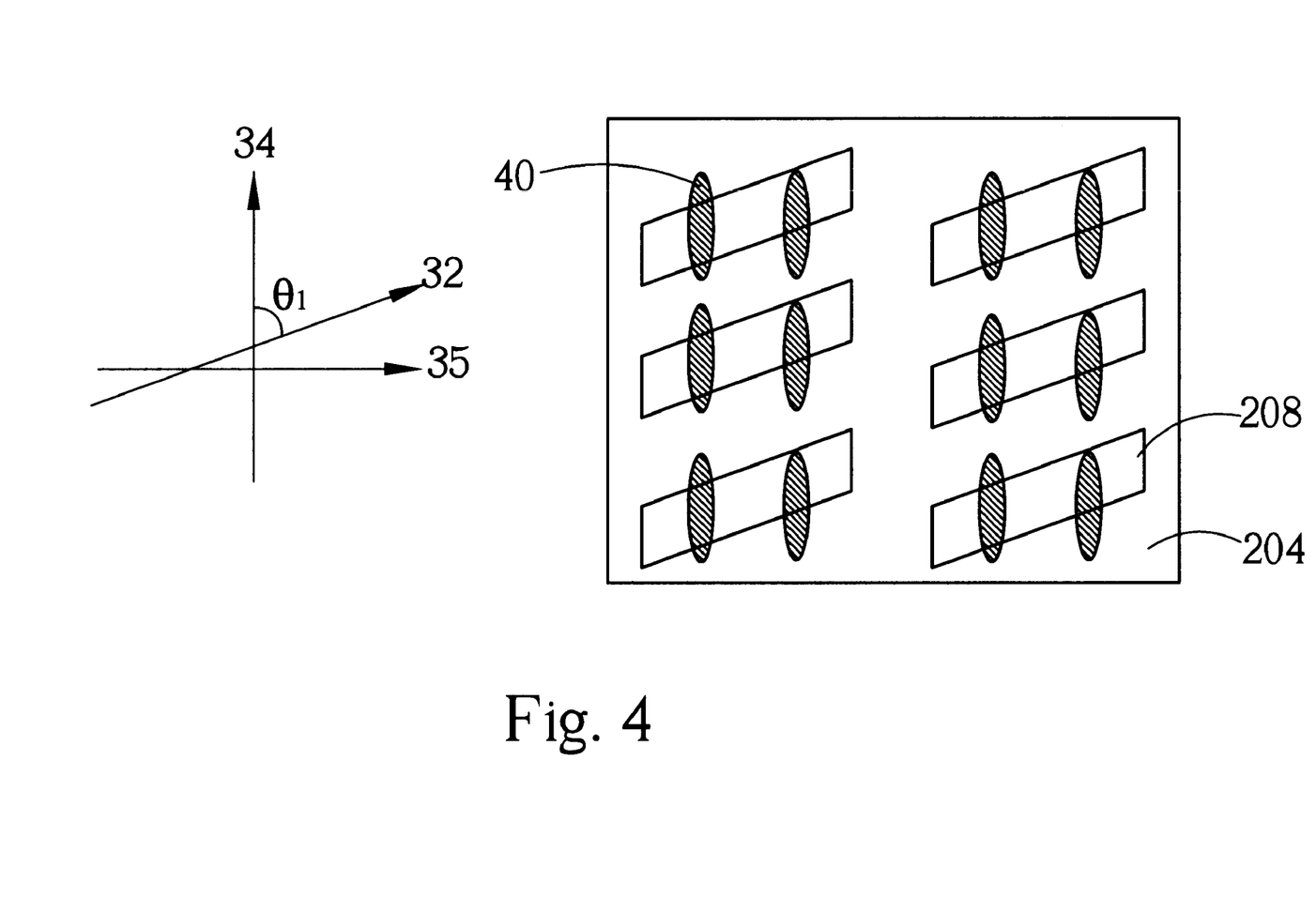
FIG. 4 is a top view of the LCD shown in FIG. 3.

Please refer to FIG. 4 which is a top view of the LCD 30 shown in FIG. 3. As shown in FIG. 4, at least one slit 208 is formed on the pixel electrode 204. The longitudinal axis of the slits is extended through a first direction 32. A plurality of anisotropic liquid crystal molecules 40 having negative dielectric constant are located between the first substrate 100 and the second substrate 200. When no electric field is applied, the longitudinal axis of the liquid crystal molecules 40 align to a second direction 34, and a angle $\theta_1$ is formed between the first direction 32 and second direction 34.

The second direction 34 is the polarized direction 34 of the second polarizer 206, and the first polarized direction 35 of the first polarizer 106 is perpendicular to the second polarized direction 34 of the second polarizer 206. A switch device (not shown) is formed on the second surface 202 of the second substrate 200, such as a thin film transistor,to control the ON/OFF of the LCD 30. When the switch device is OFF, no voltage is applied between the first electrode 104 and the pixel electrode 204, no electric field is formed, and the liquid crystal molecules 40 is aligned to the second direction 34 which is perpendicular to the polarized direction 35 of the first polarizer 106. No light can pass through the first polarizer 106, and the observer cannot see any light emitted from the LCD 30. Thus, a perfect dark state of the LCD 30 is formed.

Figure 5:
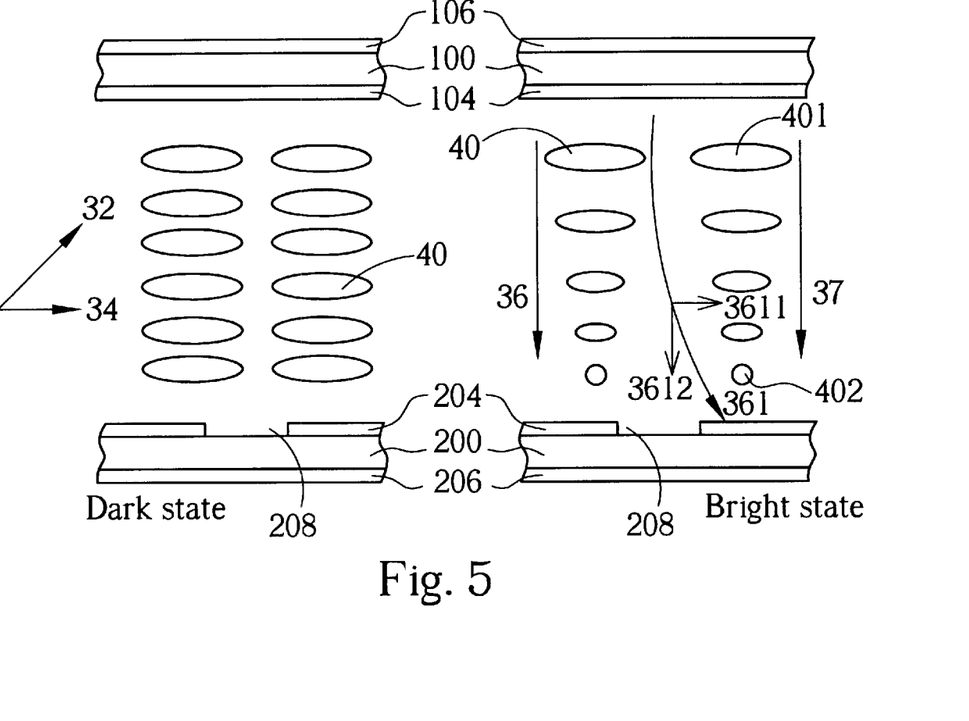
FIG. 5 a cross-sectional schematic diagram of the LCD shown in FIG. 3 via the second direction.
Figure 6:
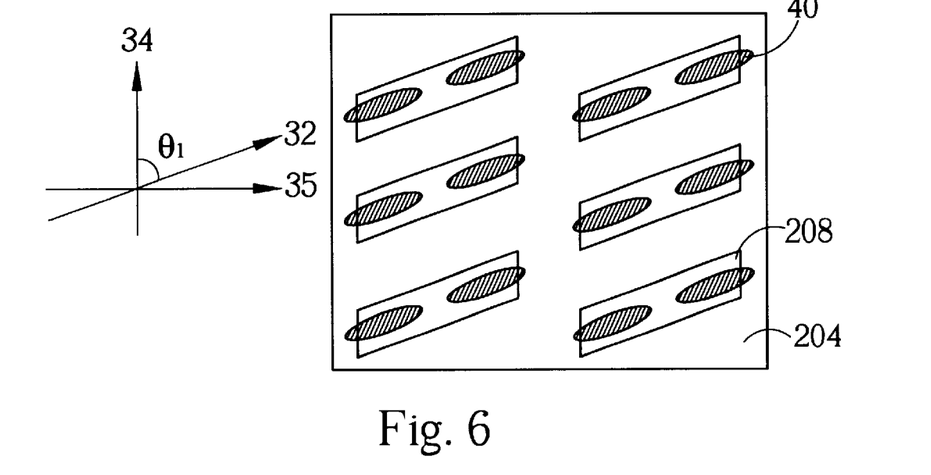
FIG. 6 is a schematic diagram of the LCD shown in FIG. 3 in the bright state.

Please refer to FIG. 5 and FIG. 6. FIG. 5 is a cross-sectional schematic diagram of the LCD 30 shown in FIG. 3 via the second direction 34. FIG. 6 is a schematic diagram of the LCD 30 in the bright state. As shown in FIG. 5, when the switching device is turned on, a voltage is applied between the first electrode 104 and the pixel electrode 204, and an electric field 36 is produced between the first electrode 104 and the pixel electrode 204. The direction 37 of the electric field 36 is perpendicular to the second direction 34. On the second substrate 200, a biased electric field 361 is produced in the neighborhood of the slit 208 on the pixel electrode 204. Therefore, a first horizontal electric field 3611 is produced in the neighborhood of the slit 208, the direction of the first horizontal electric field 3611 is perpendicular to the first direction 32, and the negative liquid crystal molecules 40 is aligned to a direction which is perpendicular to the electric field 361. After the voltage is applied, the liquid crystal molecules 402 in the neighborhood of the slit 208 gradually rotate from the original second direction 34 to the first direction 32 which is parallel to the slits 208. Furthermore, a first vertical electric field 3612, perpendicular to the second direction 34, is produced in the neighborhood of the slits 208. The first vertical electric field 3612 is perpendicular to the longitudinal axis of the negative liquid crystal molecules 40, so that the liquid crystal molecules 40 will not rotate in parallel to the direction 37 of electric field 36 and maintain in a fixed plane.

Furthermore, the longitudinal axis of the liquid crystal molecules 401 is maintained in the second direction 34 in the neighborhood of the first electrode 104 because no horizontal biased electric field is produced in the neighborhood of the first electrode 104. Therefore, the liquid crystal molecules 40 between the first electrode 104 and the first slit 208 of the pixel electrode gradually rotate from the second direction 34 to the first direction 32, and a bright state is then formed. The bright state in this embodiment is similar to that in the TN-LCD of the prior art without applying the voltage. More specifically, after the liquid crystal molecules 40 is rotated, light passes through the second polarizer 206 and gradually rotates from the second direction 34 to the first direction 32 according to the alignment of the liquid crystal molecules 40. Since the direction of the liquid crystal molecules 40 is not totally perpendicular to the polarized direction 35 of the first polarizer 106, light still can pass through the first polarizer 106 to produce the bright state of the LCD 30.

In the present invention, the liquid crystal 40 has a negative dielectric constant, and slits 208 are formed on the pixel electrode 204 to produce a biased electric field 361. Because the longitudinal axis of the negative liquid crystal molecules 40 will be perpendicular to the electric field 37, the liquid crystal molecules 40 near the slit 208 will rotate at the same plane. Thus, all the angles of the liquid crystal molecules 40 are equal no matter what position the observer is. Besides, a perfect dark state is produced when no electric field is applied. The liquid crystal molecules 40 are horizontally arranged according to the first direction 34 which is also the polarized direction of the second polarizer 206, so the liquid crystal molecules 40 are consequently perpendicular to the polarized direction 35 of the first polarizer 106, and resulting in a prefer dark state. Due to improvement of the dark state, the contrast of the LCD is also increased. The view angle is proportional to the contrast, so the view angle is improved by increasing the contrast. Therefore, the present invention provides a liquid crystal display with both high contrast and wide view angle.

Figure 7:
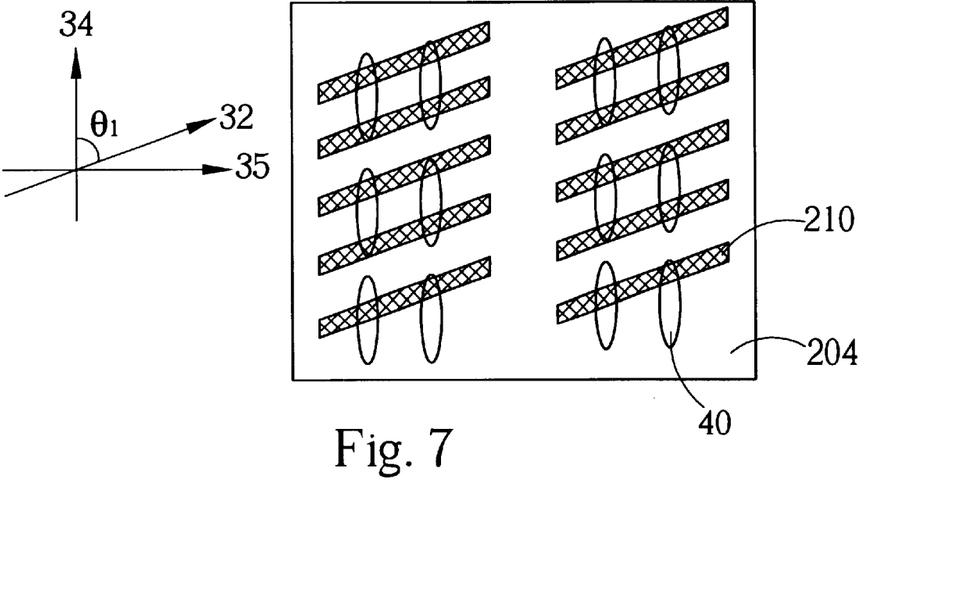
FIG. 7 is a top view of the second preferred embodiment LCD according to the present invention.
Figure 8:
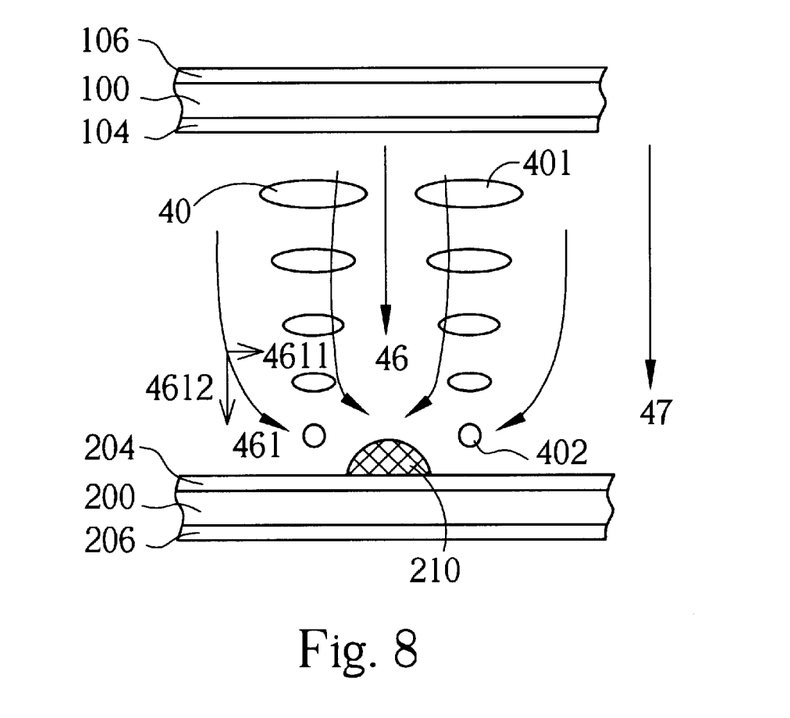
FIG. 8 is a cross-sectional schematic diagram of the second preferred embodiment LCD in the present invention.

Please refer to FIG. 7 and FIG. 8 which are the top view and cross-sectional diagram of the second preferred embodiment. In the first preferred embodiment, the silts 208 are used to form the biased electric field, and then form a horizontal and a vertical biased electric field that are perpendicular to the first direction 32 and the second direction 34. On the contrary, in the second preferred embodiment, a protrusion 210 is used to form the biased electric field. The protrusion 210 can be made of a conductive or dielectric material. In the present invention, the protrusion 210 is formed by the dielectric material for simplifying the manufacturing process and reducing the cost of the display.

As shown in FIG. 7, the protrusions 210 are formed on the surface of the pixel electrode 204 along the first direction 32. As shown in FIG. 8, when the voltage is applied between the first electrode 104 and the pixel electrode 204, an electric field 46 is produced, and a biased electric field 461 is formed near the protrusions 210. Further, a horizontal biased electric field 4611 is produced from the biased electrical field 461 in the neighborhood of the protrusions 210. The horizontal biased electric field 4611 is perpendicular to the first direction 32, so the longitudinal axis of the liquid crystal molecules 402 in the neighborhood of the protrusions 210 will rotate in parallel to the first direction 32. In addition, no horizontal biased electrical field occurs near the first electrode 104, so the longitudinal axis of the liquid crystal molecules 401 maintain in the second direction 34 near the first electrode. Viewing the LCD as the whole, the liquid crystal molecules 40 is rotated to produce the bright state of the LCD.

Figure 9:
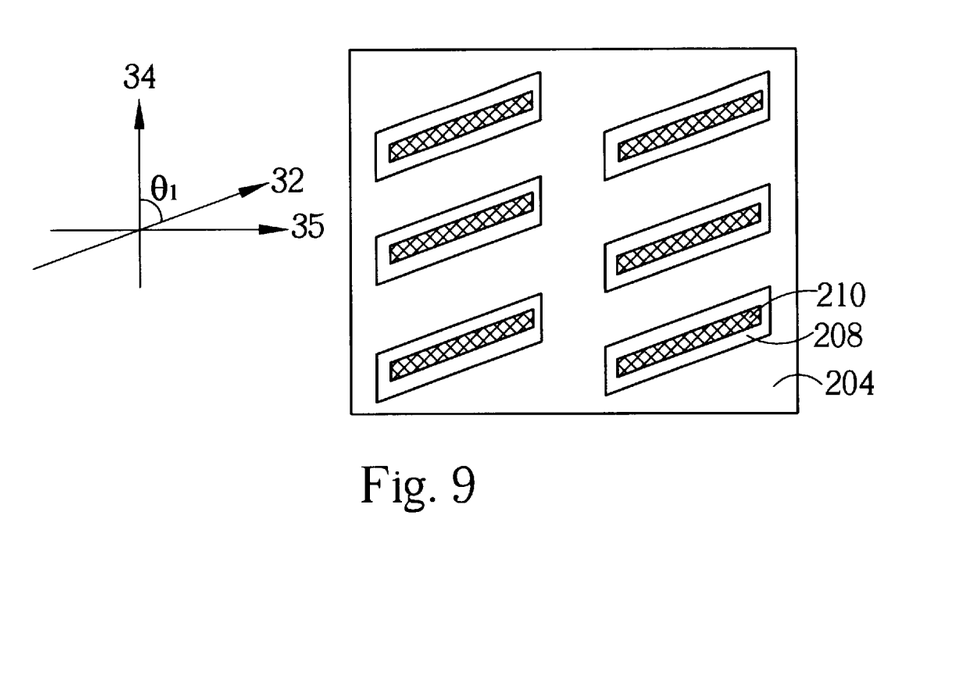
FIG. 9 is a top view of the third preferred embodiment LCD according to the present invention.
Figure 10:
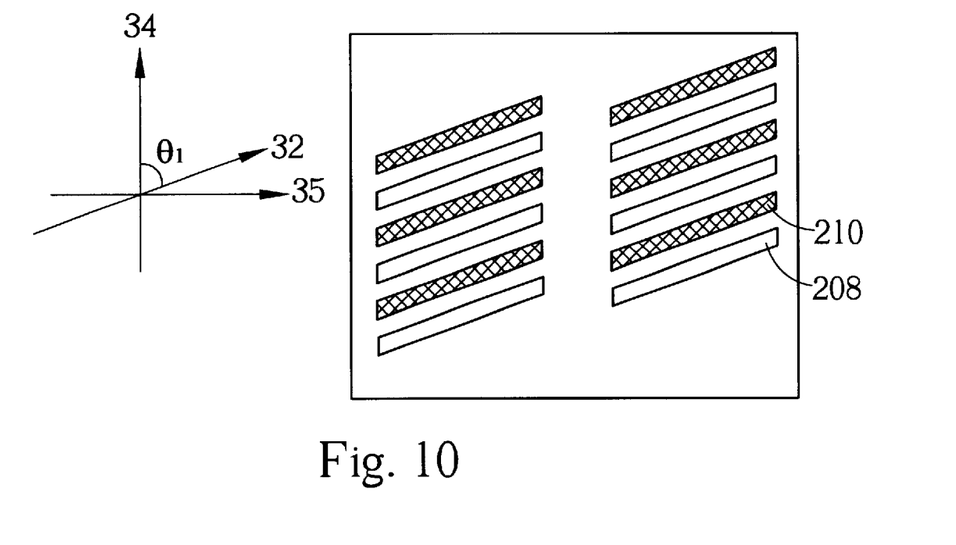
FIG. 10 is a top view of the fourth preferred embodiment LCD according to the present invention.

Please refer to the FIG. 9 and FIG. 10 which are top views of the third and fourth preferred embodiments of the present invention. In the present invention, slits 208 and protrusions 210 can be formed in the same time to fulfill different designs. As shown in FIG. 9, one or more protrusions 210 are formed in the slits 208 on the pixel electrode 204. As shown in FIG. 10, one or more protrusions 210 are formed between the slits 208. Both the slits 208 and the protrusions 210 are extended along the first direction in order to allow the liquid crystal molecules 40 being rotated regularly.

Figure 11:
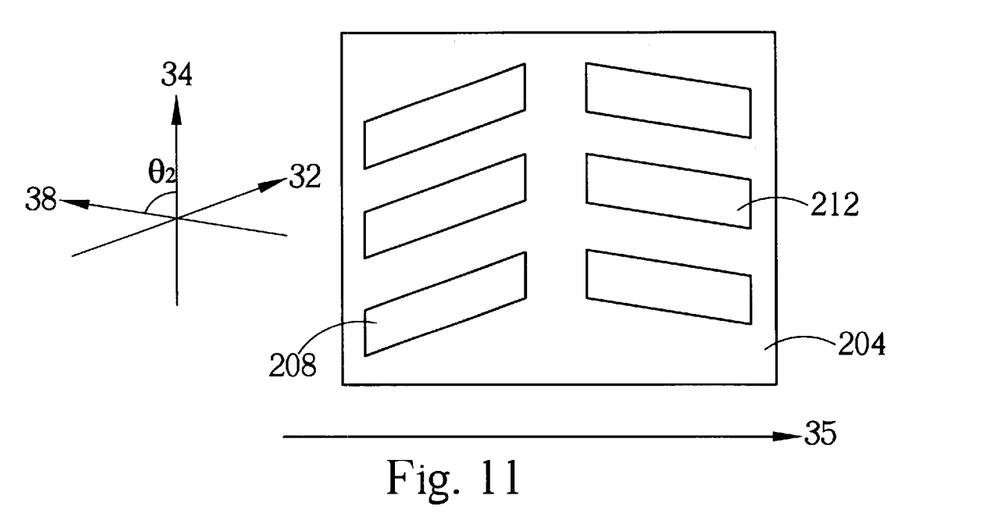
FIG. 11 is a top view of the fifth preferred embodiment LCD according to the present invention.
Figure 12:
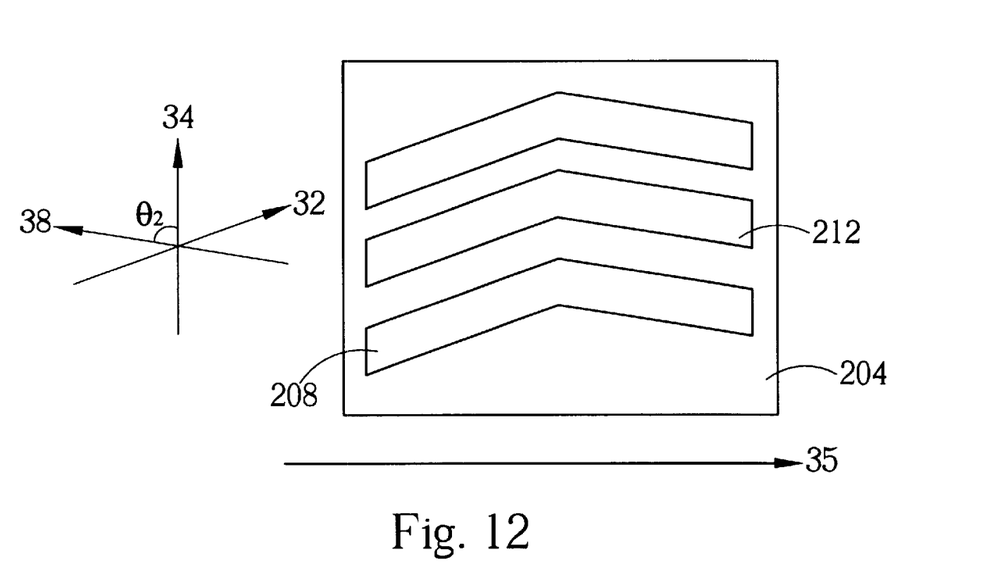
FIG. 12 is a top view of the sixth preferred embodiment LCD according to the present invention.

Please refer to FIG. 11 and FIG. 12 which are top views of the fifth and sixth preferred embodiments. The slits and protrusions with different directions can be formed on the pixel electrode 204 for increasing the view angle of the LCD 30. As shown in FIG. 11, except the slits 208, the LCD 30 further includes at least one slit 212 formed on the pixel electrode 204 along a third direction 38. A angle $\theta_2$ is formed between the second direction 34 and the third direction 38. When a voltage is applied between the first electrode 104 and the pixel electrode 204, the liquid crystal molecules in the neighborhood of the slits 212 (not shown in FIG. 11) will rotate from the second direction 34 to the direction parallel to the third direction 38.

As shown in FIG. 12, the slits 212 are connected to the slits 208 in the sixth preferred embodiment. Furthermore, one or more protrusions 210 can be formed in or between the slits 208. Besides, one or more protrusions (not shown) can also be formed in or between the slits 212 along the third direction. The protrusion in or between the slits 212 can be connected to the protrusion 210 in or between the slits 208.

Figure 13:
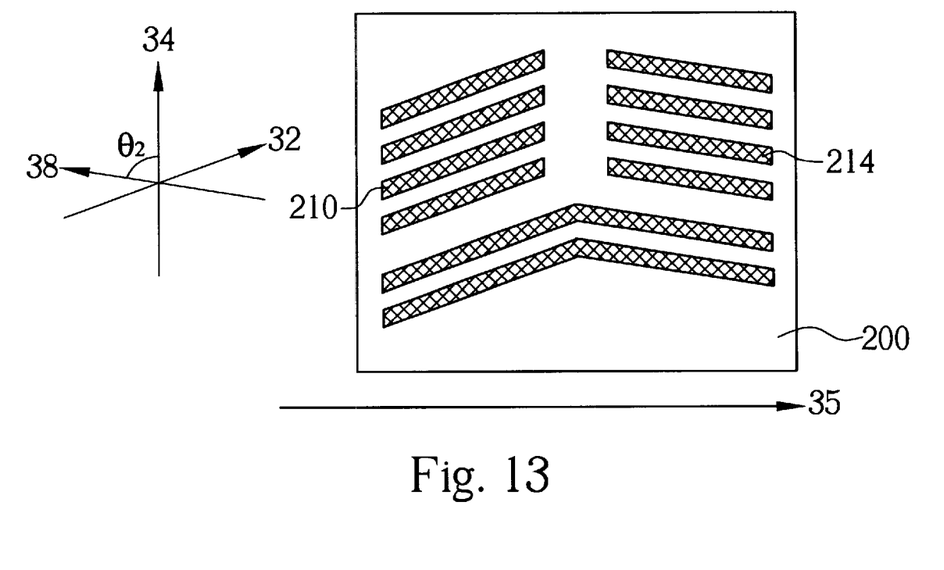
FIG. 13 is a top view of the seventh preferred embodiment LCD according to the present invention.
Figure 14:
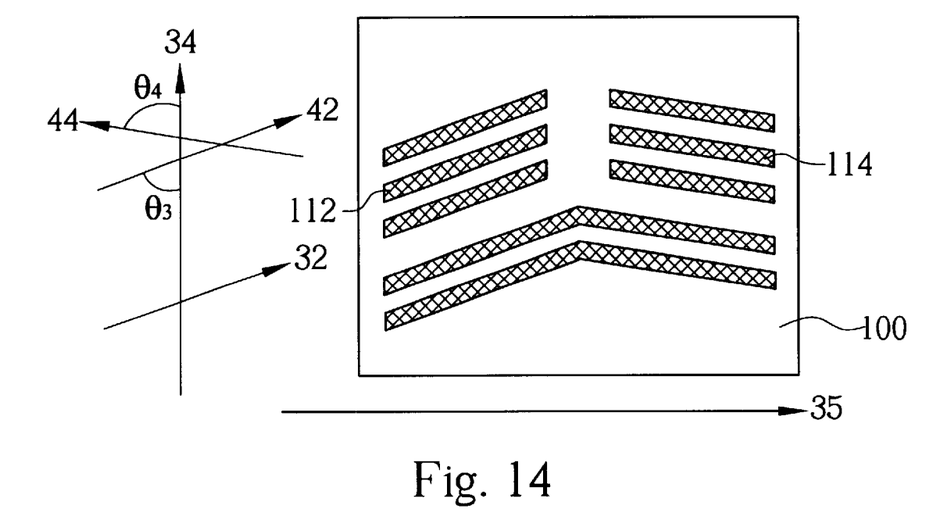
FIG. 14 is a top view of the eighth preferred embodiment LCD according to the present invention.

Please refer to FIG. 13. FIG. 13 is a top view of the seventh preferred embodiment according to the present invention. The protrusions 210, 214 are formed on the pixel electrode 200. The protrusion 210 is extended along the first direction 32, and the protrusion 214 is extended along the third direction 38 so that the liquid crystal molecules can be symmetrically aligned and the display quality of the LCD 30 is also improved. Similarly, the protrusion 214 can be connected or unconnected to the protrusion 210. Please refer to FIG. 14 which is a top view of the eighth preferred embodiment. The protrusions 112, 114 can also be formed on the first electrode 100. The protrusion 112 is extended along the fourth direction 42, and the protrusion 114 is extended along the fifth direction 44. The fourth direction 42 is at an angle $\theta_3$ to the second direction 34, and the fifth direction 44 is at an angle $\theta_4$ to the second direction 34. Therefore, the liquid crystal molecules can be symmetrically aligned. Similarly, the protrusion 112 can be connected or unconnected to the protrusion 114.

Figure 15:
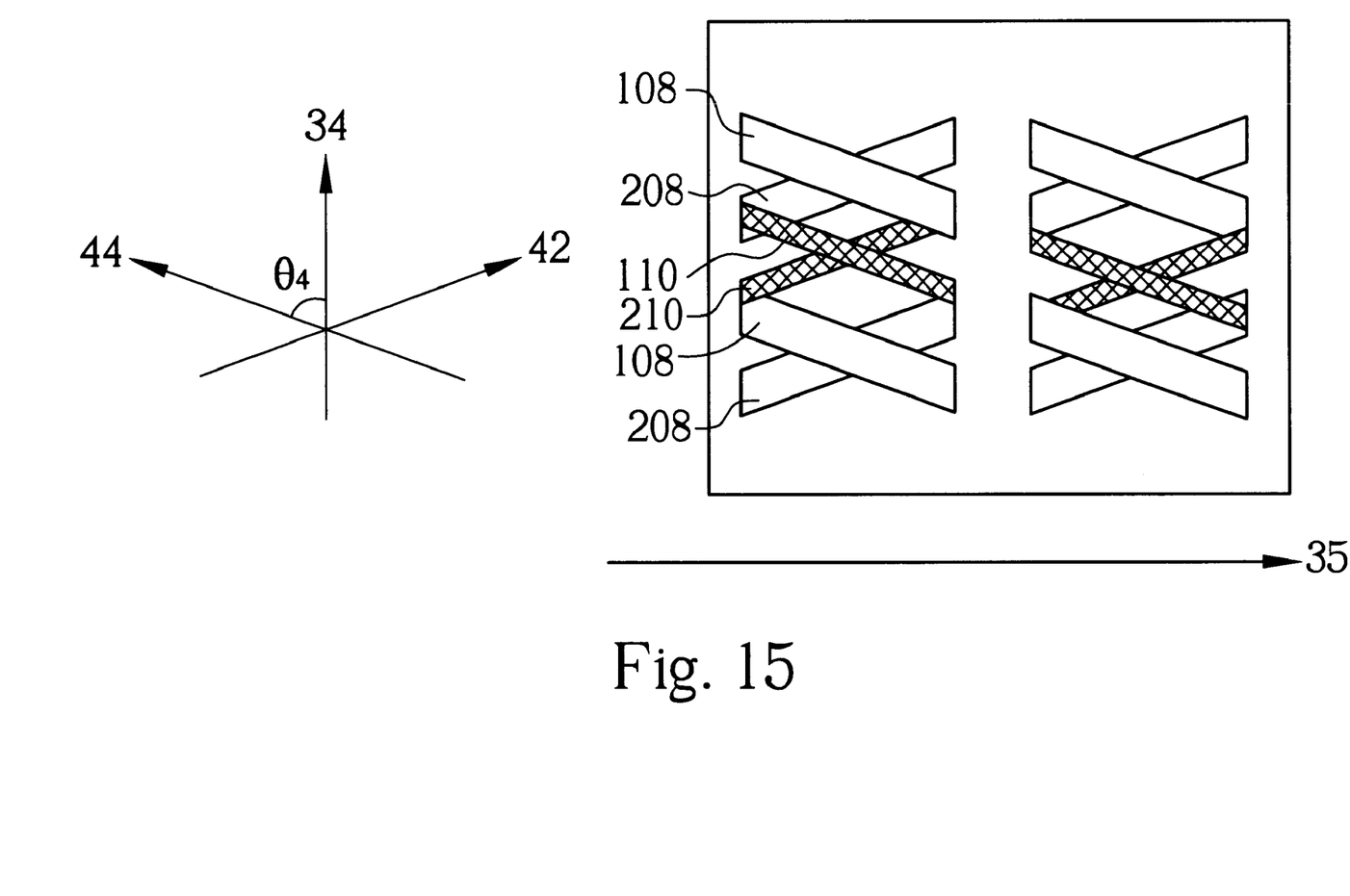
FIG. 15 is a top view of the ninth preferred embodiment LCD according to the present invention.

Please refer to the FIG. 15. FIG. 15 is a top view of the ninth preferred embodiment. In above preferred embodiments, all improved are designed on only one substrate. The improvement is designed on both of two substrates in the ninth preferred embodiment. In other words, at least one slit and protrusion can be formed on both of the first electrode and the pixel electrode. The quantities and directions of the slits and protrusions are varied according the different designs. A simpler structure is illustrated in FIG. 15. As shown in FIG. 15, at least one slit 108 and protrusion 110 are formed on the first electrode 104 along the fifth direction 44, and at least one slit 208 and protrusion 210 are formed on the pixel electrode 204 along the fourth direction 42. When the voltage is applied between the first electrode 104 and the pixel electrode 204, the liquid crystal molecules near the slits 108 and the protrusions 110 on the first electrode 104 are aligned in parallel to the fifth direction 44, while the liquid crystal molecules near the slits 208 and the protrusions 210 on the pixel electrode 204 are aligned in parallel to the fourth direction 42.

In the present invention, negative liquid crystal molecules 40 are used in the LCD 30, and several slits or protrusions are positioned on the electrode to form a biased electric field. The biased electric field includes a horizontal and a vertical biased electric field, which are perpendicular to or in parallel with the longitudinal axis of the liquid crystal molecules 40. Therefore, the liquid crystal molecules 40 can rotate on the same plane, and the image will be unaffected by the pre-tilt angle of the liquid crystal molecules 40 so that the display quality of the LCD is improved.

In contrast to the TN-LCD 10 in the prior art, the liquid crystal molecules 40 in the LCD 30 of the present invention have a smaller pre-tilt angle, so that the light flux passing through the liquid crystal molecules 40 will not be affected when viewing from different positions. Therefore, the LCD 30 has larger view angle, and resolves the problem about the asymmetry of the left and right view angles in the prior art.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A liquid crystal display comprising:
   a first substrate comprising a first surface;
   a second substrate comprising a second surface, the second surface being in parallel with and opposite to the first surface of the first substrate, and a pixel area being defined on the second surface;
   a first electrode positioned on the first surface of the first substrate;
   a pixel electrode positioned on the pixel area of the second substrate, the pixel electrode having a first slit positioned along a first direction; and
   a plurality of anisotropic liquid crystal molecules with negative dielectric constant positioned between the first electrode and the pixel electrode, the longitudinal axis of the liquid crystal molecules being positioned along a second direction horizontally, and paralleled to the first electrode and the pixel electrode, a first angle being formed between the second direction and the first direction;
   wherein when a voltage is applied between the first electrode and the pixel electrode, a biased electrical field is formed between the first electrode and the pixel electrode, such that (a) a first horizontal biased electric field is formed in the neighborhood of the first slit, and the first horizontal biased electric field is perpendicular to the first direction to rotate the liquid crystal molecules and make the longitudinal axis of the liquid crystal molecules in the neighborhood of the first slit rotate in parallel to the first direction, (b) the longitudinal axis of the liquid crystal molecules in the neighborhood of the first electrode maintain along the second direction because no horizontal biased electrical field is formed near the first electrode, and (c) the liquid crystal molecules between the first electrode and the first slit gradually rotate from the second direction to the first direction.

2. The liquid crystal display of claim 1 wherein the pixel electrode further comprises a first protrusion extending along the first direction, and the first protrusion is located in the first slit.

3. The liquid crystal display of claim 2 wherein the first protrusion is made of a material selected from a group consisting of a photoresist layer, a conductive layer, and a dielectric layer.

4. The liquid crystal display of claim 1 wherein the pixel electrode further comprises a second protrusion with a rectangular sharp, and the second protrusion is parallel with the first slit.

5. The liquid crystal display of claim 1 wherein the width of the shorter edge of the first slit on the pixel electrode is between 5 to 20 $\mu$m.

6. The liquid crystal display of claim 1 wherein the pixel electrode further comprises a second slit with a rectangular shape, the longitudinal axis of the second slit is extending along a third direction, the third direction is different from the first direction, and a second angle is formed between the third direction and the second direction;
   when the biased electric field is formed between the first electrode and the pixel electrode, a second horizontal biased electric field is produced in the neighborhood of the second slit, and the second horizontal biased electric field is perpendicular to the third direction for rotating the liquid crystal molecules and turning the longitudinal axis of the liquid crystal molecules in the neighborhood of the second slit from the second direction to the third direction.

7. The liquid crystal display of claim 6 wherein the first slit is connected to the second slit.

8. The liquid crystal display of claim 6 wherein the pixel electrode further comprises a third protrusion with a rectangular shape extending along the third direction and positioned in the second slit.

9. The liquid crystal display of claim 6 wherein the pixel electrode further comprises a fourth protrusion with a rectangular shape paralleled to the second slit.

10. The liquid crystal display of claim 1 wherein the first electrode further comprises a third slit with a rectangular shape extending along a fourth direction, and a third angle is formed between the fourth direction and the second direction;
    when the biased electric field is formed between the first electrode and the pixel electrode, a third horizontal biased electric field is produced in the neighborhood of the third slit, and the third horizontal electric field is perpendicular to the fourth direction for turning the longitudinal axis of the liquid crystal molecules in the neighborhood of the third slit from the second direction to the fourth direction.

11. The liquid crystal display of claim 10 wherein the first electrode further comprises a fifth protrusion with a rectangular shape extending along the fourth direction and positioned in the third slit.

12. The liquid crystal display of claim 10 wherein the first electrode further comprises a sixth protrusion with a rectangular shape paralleled to the third slit.

13. The liquid crystal display of claim 12 wherein the first electrode further comprises a fourth slit with a rectangular shape extending along a fifth direction, the fifth direction is different from the fourth direction, and a fourth angle is formed between the fifth direction and the second direction;
    when the biased electric field is produced between the first electrode and the pixel electrode, a fourth horizontal biased electric field is formed in the neighborhood of the fourth slit, and the fourth horizontal electric field is perpendicular to the fifth direction for rotating the liquid crystal molecules and turning the longitudinal axis of the liquid crystal molecules in the neighborhood of the fourth slit from the second direction to the fifth direction.

14. The liquid crystal display of claim 13 wherein the third slit is connected to the fourth slit.

15. The liquid crystal display of claim 13 wherein the first electrode further comprises a seventh protrusion extending along the fourth direction and located in the fourth slit.

16. The liquid crystal display of claim 13 wherein the first electrode further comprises an eighth protrusion with a rectangular shape paralleled to the fourth slit.

17. A liquid crystal display comprising:
    a first substrate comprising a first surface;
    a second substrate comprising a second surface, the second surface being in parallel and opposite to the first surface of the first substrate, and a pixel area is defined on the second surface;
    a first electrode positioned on the first surface of the first substrate;

a pixel electrode positioned on the pixel area of the second substrate;

at least one first protrusion positioned on the pixel electrode along a first direction; and a plurality of anisotropic liquid crystal molecules with negative dielectric constant filled in between the first electrode and the pixel electrode, the longitudinal axis of the liquid crystal molecules being positioned along a second direction horizontally and paralleled to the first electrode and the pixel electrode, a first angle being formed between the second direction and the first direction;

wherein when a voltage is applied between the first electrode and the pixel electrode, a biased electric field is formed between the first electrode and the pixel electrode, such that (a) a first horizontal biased electric field is formed in the neighborhood of the first protrusion, and the first horizontal biased electric field is perpendicular to the first direction to rotate the liquid crystal molecule and make the longitudinal axis of the liquid crystal molecules in the neighborhood of the first protrusion to be in parallel to the first direction, (b) the longitudinal axis of the liquid crystal molecules in the neighborhood of the first electrode maintain in the second direction because no horizontal biased electrical field is produced in the neighborhood of the first electrode, and (c) the liquid crystal molecules located between the first electrode and the first protrusion gradually rotate from the second direction to the first direction.

18. The liquid crystal display of claim 17 wherein the first protrusion is formed by a material selected from a group consisting of a photoresist layer, a conductive layer, and a dielectric material.

19. The liquid crystal display of claim 17 wherein the pixel electrode further comprises a first slit with a rectangular shape paralleled to the first protrusion.

20. The liquid crystal display of claim 17 wherein the width of the shorter edge of the first protrusion is between 5 to 20 μm.

21. The liquid crystal display of claim 17 wherein the pixel electrode further comprises a second protrusion with a rectangular shape, the longitudinal axis of the second protrusion being extended along a third direction, the third direction is different from the first direction, and a second angle is formed between the third direction and the second direction;

when the biased electric field is formed between the first electrode and the pixel electrode, a second horizontal biased electric field is formed in the neighborhood of the second protrusion and is perpendicular to the third direction, and the second horizontal biased electric field is to make the longitudinal axis of the liquid crystal molecules in the neighborhood of the second protrusion rotate from the second direction to the third direction.

22. The liquid crystal display of claim 21 wherein the first protrusion is connected to the second protrusion.

23. The liquid crystal display of claim 21 wherein the pixel electrode further comprises a second slit with a rectangular shape paralleled to the second protrusion.

24. The liquid crystal display of claim 17 wherein the first electrode further comprises a third protrusion with a rectangular shape, the longitudinal axis of the third protrusion is extended along a fourth direction, and a third angle is formed between the fourth direction and the second direction;

when the biased electric field is formed between the first electrode and the pixel electrode, a third horizontal biased electric field is produced in the neighborhood of the third protrusion, and the third horizontal biased electric field is perpendicular to the fourth direction for rotating the longitudinal axis of the liquid crystal molecules in the neighborhood of the third protrusion from the second direction to the fourth direction.

25. The liquid crystal display of claim 24 wherein the first electrode further comprises a third slit with a rectangular shape paralleled to the third protrusion.

26. The liquid crystal display of claim 24 wherein the first electrode further comprises a fourth protrusion with a rectangular shape, the longitudinal axis of the fourth protrusion is extended along a fifth direction, the fifth direction is different from the fourth direction, and the fifth direction is at a fourth angle to the second direction;

when the biased electric field is formed between the first electrode and the pixel electrode, a fourth horizontal biased electric field is formed in the neighborhood of the fourth protrusion, and the fourth horizontal biased electrical field is perpendicular to the fifth direction for turning the longitudinal axis of the liquid crystal molecules in the neighborhood of the fourth protrusion from the second direction to the fifth direction.

27. The liquid crystal display of claim 26 wherein the third protrusion is connected to the fourth protrusion.

28. The liquid crystal display of claim 26 wherein the first electrode further comprises a fourth slit paralleled to the fourth protrusion.

* * * * *